United States Patent [19]

Horton

[11] Patent Number: 4,946,280

[45] Date of Patent: Aug. 7, 1990

[54] WAVEFRONT ANALYSIS FOR SEGMENTED MIRROR CONTROL

[75] Inventor: Richard F. Horton, Las Cruces, N. Mex.

[73] Assignee: Massachusetts Institute of Technology, Cambridge, Mass.

[21] Appl. No.: 245,134

[22] Filed: Sep. 15, 1988

[51] Int. Cl.$^5$ ............................................. G01B 9/02
[52] U.S. Cl. ...................................... 356/353; 356/363
[58] Field of Search ................................ 356/353, 363

[56] References Cited

U.S. PATENT DOCUMENTS

| | | |
|---|---|---|
| 3,829,219 | 8/1974 | Wyant . |
| 3,923,400 | 12/1975 | Hardy . |
| 4,136,954 | 1/1979 | Jamieson ............................ 356/349 |
| 4,600,308 | 7/1986 | Waite . |
| 4,688,941 | 7/1987 | Philbert . |
| 4,705,400 | 11/1987 | Ellerbroek et al. . |

Primary Examiner—Davis L. Willis
Assistant Examiner—Matthew W. Koren
Attorney, Agent, or Firm—Hamilton, Brook, Smith & Reynolds

[57] ABSTRACT

A method for analyzing a wavefront of light finds application in the control of mirror segments in a segmented mirror array. A shearing interferometer is used to combine a beam of light from a reference mirror segment with beams from individual controllable segments, creating detectable interference. The path length through the interferometer is modulated in time in a focusing region, causing the wavefronts of the beams to fluctuate in curvature. Magnification of one of the beams relative to the other gives it a less severe curvature in the region where the beams overlap. Orientation differences between compared segments can be found at a point of interference detection by comparing, with regard to the modulation cycle, the detection time of the wavefront in question and the detection time of the reference wavefront. By shearing the light from a number of segments with different parts of the reference wavefront, orientation differences for a number of segments can be detected simultaneously. Actuators on the controllable segments corresponding to the detectors in the interference region can be used to adjust the segments, reducing the orientation differences.

30 Claims, 4 Drawing Sheets

Fig. 4

WAVEFRONT ANALYSIS FOR SEGMENTED MIRROR CONTROL

The Government has rights in this invention pursuant to grant No. F19628-85-C-0002 awarded by the Department of the Air Force.

BACKGROUND OF THE INVENTION

This invention relates to the analysis of a wavefront of light, and more specifically, to the comparative analysis of two different portions of a wavefront of light. During transmission, distortions in a wavefront surface of a beam of light may occur if portions lag behind the rest of the beam in time. In some systems, knowledge of the wavefront distortion allows for compensation techniques to be applied to correct the wavefront deformities.

A particular application of wavefront analysis relates to the alignment of mirror segments in a segmented mirror system. A segmented mirror system replaces a monolithic primary mirror used in large aperture telescopes which are becoming increasingly more popular for both astronomical and military applications. Segmented mirror systems use arrays of smaller optical segments, each of which must be actively controlled to allow the composite optical surface to maintain the desired shape of an ideal monolithic surface.

In such systems, it is not only necessary to control the tilt of a mirror segment along two axes, but the displacement of the segment along the direction of incident light as well. The three degrees of control per segment allow two or more segments to reflect light from a given source to the same geometric point with the same phase so that the light behaves as if it were reflected from a single ideal surface.

The errors in tilt are easily handled, since they can be readily observed in the far field of the telescope. The displacement errors are not so readily observed, however, since they are normal to any image surface and must be measured to a fraction of the wavelength of light. Methods recently proposed to deal with this error are absolute distance measurement, diffraction pattern analysis, and edge sensing. All of these methods seem viable, but all appear less than straightforward.

SUMMARY OF THE INVENTION

The present invention provides a method of analyzing a wavefront of light by introducing the light into a shearing interferometer which divides the light into multiple wavefronts in plural paths. The curvatures of the multiple wavefronts are then modulated with time, and the wavefronts are recombined. The interference of the recombined wavefronts is detected as a function of time, indicating the relative curvature of the sheared portions of the original wavefront.

The shearing of the multiple wavefronts can be accomplished radially by optical elements placed in the plural paths to magnify and minify the wavefronts relative to one another and provide the necessary overlap. Since for a wider bandwidth of light, the the interference fringe is narrower, white light is preferred for the present invention. This makes the detection of the fringe more accurate since the fringe will be detected for a shorter period of time during the modulation cycle.

Where the input is not collimated, it is preferable to use a collimator at the input of the interferometer to cause the input wavefront to be near planar, although the light does not stay collimated when it is divided and magnified or minified. The wavefronts are modulated before being recombined. This is accomplished by varying the length of the plural paths with time.

If this wavefront analysis method is used to control the orientation of reflective surfaces, such as mirror segments, the incoming beam must be a combination of wavefronts from at least two surfaces. After the beam is divided, it is recombined to overlap portions of the divided beams corresponding to images of different mirror segments, so that light originating from different mirror segments is combined to create an interference fringe. If one of the segments is chosen as a reference segment, the other segments are adjusted relative to that reference.

The recombined light is directed to a detection surface which is preferably conjugate to the original surface under control. This detection surface contains means for detecting the interference at more than one point. One detection point is chosen as a reference which always detects a zero difference in orientation between the segment portion being controlled and the reference segment. Other detectors placed in the detection region detect an interference fringe at different times in the modulation cycle relative to the reference detector. The lead or lag time of the detection as compared to the reference detector indicates a relative difference in surface orientation. Adjusting the position of the segment to reduce the lead or lag time aligns that part of the segment with the reference.

After beam division, the two components of the divided wavefront can utilize one axis along which they counterpropagate. In such a case, the same optical elements which magnify one of the components can minify the other component to give any desired amount of radial shear. To create the modulation of the wavefront curvatures, the two counterpropagating beams are focused along the same axis such that as the path length is modulated, the two focal points move back and forth along the axis, crossing through a point where they intersect. The interference fringe created by the recombined wavefront therefore moves back and forth across the detection region. The curvature change due to modulation is greater for the minified wavefront than the magnified wavefront. The minified wavefront will thus cross through the magnified wavefront repeatedly as the wavefronts are modulated.

As part of the present invention, an interferometer design of the radial shearing type is presented. This interferometer includes a beam splitter to divide the entering light into two beams counterpropagating along a common beam axis. If a collimator is included in the front end of the design, the incoming wavefront is somewhat planar when it reaches the beam splitter. The two beams are focused, one of them being magnified while the other is minified, and are then recombined to create detectable interference.

Modulation within the interferometer is accomplished by varying the length of the common beam axis with time. A design that achieves this comprises a pair of mirrors along the common beam axis which are moved toward and away from the rest of the optical elements along the axis. Since the modulation is to a common axis, the counterpropagating beams face an equal path distance at any point in time, ensuring a synchronous modulation. The movable mirrors should be placed so that a focal point of each of the counterpropagating beams lies between them. This placement helps to ensure the proper modulation of wavefront curvature with time.

BRIEF DESCRIPTION OF THE DRAWINGS

FIG. 4 diagrams examples of modulating wavefront curvature for different mirror alignments of three mirror segments.

PREFERRED EMBODIMENT OF THE INVENTION

Figure 1:
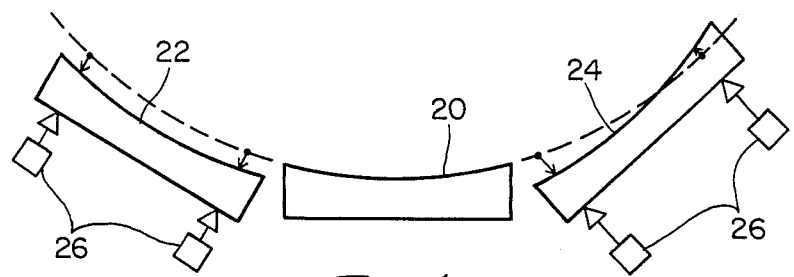
FIG. 1 is a side view of two controllable mirror segments and a reference mirror segment in a segmented mirror array.

A segmented mirror array is typical of a system which relies on the relative alignment of reflective surfaces. FIG. 1 shows a side view of three mirror segments in an array. The center segment 20 is chosen as a reference surface, and the other two surfaces are adjustable mirrors. An alignment difference found between the reference surface 20 and an adjustable mirror 22, 24 serves as means for adjusting the mirror 22, 24. If the dashed line of FIG. 1 represents the desired composite curvature of the three surfaces 20, 22, 24, the mirrors 22, 24 are adjusted until the alignment differences between each of them and the reference surface 20 are zero. The actuators 26 on the bottom of the mirror segments 22, 24 serve to adjust the positioning of the segments 22, 24.

The example of FIG. 1 is simplified in that there are only two actuators per mirror segment. A segment actually needs three actuators to allow three degrees of freedom per segment. The three degrees of freedom are tilt along two perpendicular axes and absolute position of the segment along the direction of incident light. Controlling these three variables requires at least three point error signals per mirror segment.

Figure 2:
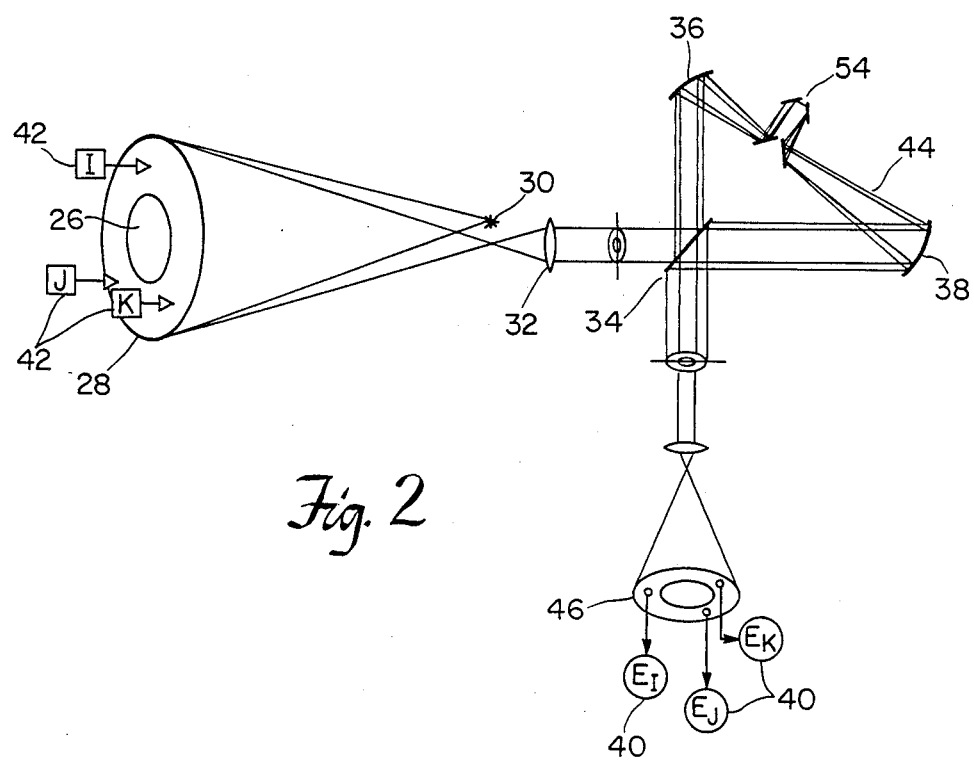
FIG. 2 is an overview of one embodiment of the present invention.

FIG. 2 is one embodiment of the present invention. A segmented spherical mirror 26. 28 to be controlled is illuminated by a point white light source 30 at its radius of curvature. For the purposes of the present invention, white light is considered to be light for which the half-power bandwidth $\Delta\lambda$ is at least one half of the center wavelength $\lambda_c$ of the band. For effective operation of the present invention, $\Delta\lambda$ should be no less than one tenth of $\lambda_c$.

Upon reflection from the mirror system 26. 28, the white light is collimated after focus by the collimator 32. The light is then divided into two beams by the beam splitter 34. The divided beams counterpropagate along a common beam axis, getting magnified or minified depending on which direction they travel through the optical path. The reflecting optics 36, 38 are off axis parabolas which generate coincident foci in the bidirectional circuit of light 44. The light reaches the beam splitter for the second time, and the two collimated beams are there recombined before reaching the photosensitive detectors 40.

The inner portion 26 of the segmented mirror is chosen as a reference segment while the annularly shaped portion 28 is the surface under control. Since the counterpropagating beams are magnified and minified relative to one another, there is a region in the recombined wavefront where the image of the reference mirror 26, as carried by the magnified beam, overlaps with the image of the mirror under control 28, as carried by the minified beam. It is in this overlapping region of the detection surface 46 that the detectors 40 are placed. Each detector has a corresponding actuator 42 on the mirror 28 under control which responds to the detector signal. The movement of these actuators 42 reduces the errors detected at the detection surface 46, and brings the mirror 28 in line with the reference surface 26.

Figure 3:
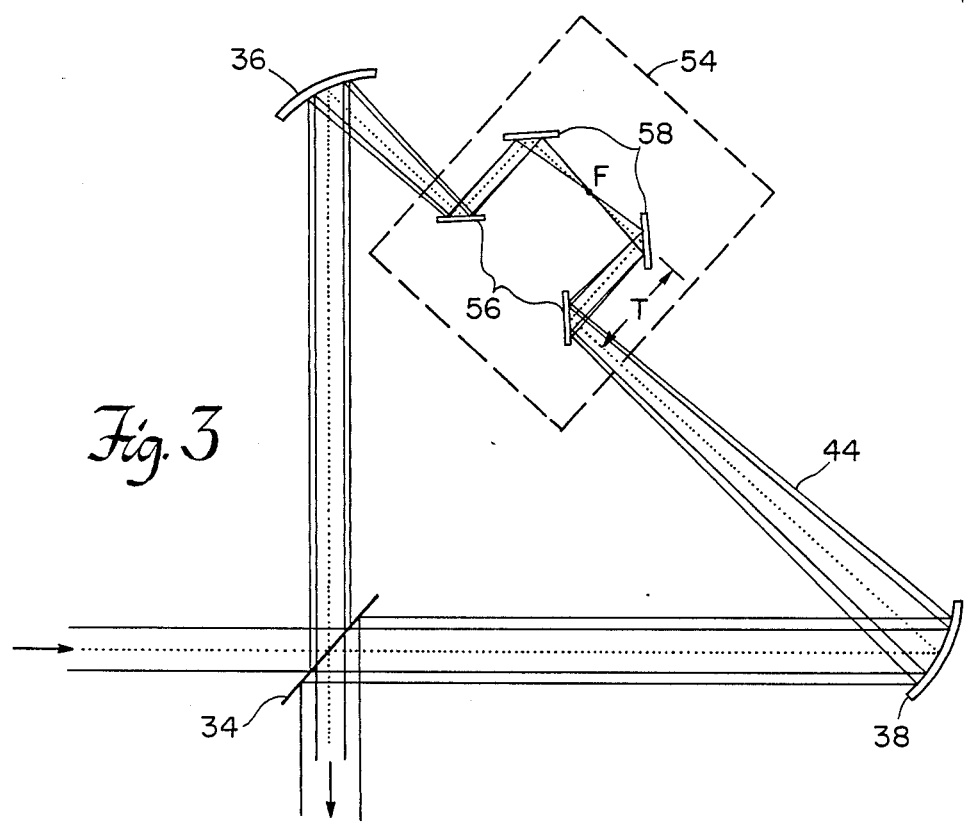
FIG. 3 is shows a means for modulating the path length through a shearing interferometer.

The path length modulation in the bidirectional circuit of light 44 is accomplished by an optical "trombone" 54 within the beam path. FIG. 3 is a diagram of the trombone 54 which is inserted between the two off axis parabolas 36, 38. The trombone 54 consists of four mirrors, two stationary mirrors 56, and two movable mirrors 58 which move together toward and away from the stationary mirror pair 56. The trombone is positioned such that the foci of the off axis parabolas 36, 38, fall between the movable mirrors 58. The distance, T, between the two pairs of mirrors is varied with time, and the overall length of the bidirectional beam path is modulated. This causes the foci of the off axis parabolas 36, 38 to slide back and forth along the same axis crossing through a point F where they coincide.

The path length modulation along the bidirectional beam path 44 causes the spherical wavefronts of the counterpropagating beams to change curvature with time. When the path length is increased beyond the point where the foci intersect, each focused beam from one of the off-axis parabolas has a greater distance to travel to reach the opposite parabola. Because of the focus, the outer portions of the beams will lag in time due to the increased path distance. When the path length is correspondingly decreased past the foci intersection point the outer beam portions will lead in time. The path length modulation therefore causes a fluctuating wavefront curvature around the beam axis. For the overlapping region, light from the reference mirror 26 is carried by the magnified beam, and the light from the controlled mirror 28, is carried by the minified beam. Therefore the curvature change is less severe for the light from the reference mirror.

Figure 4:
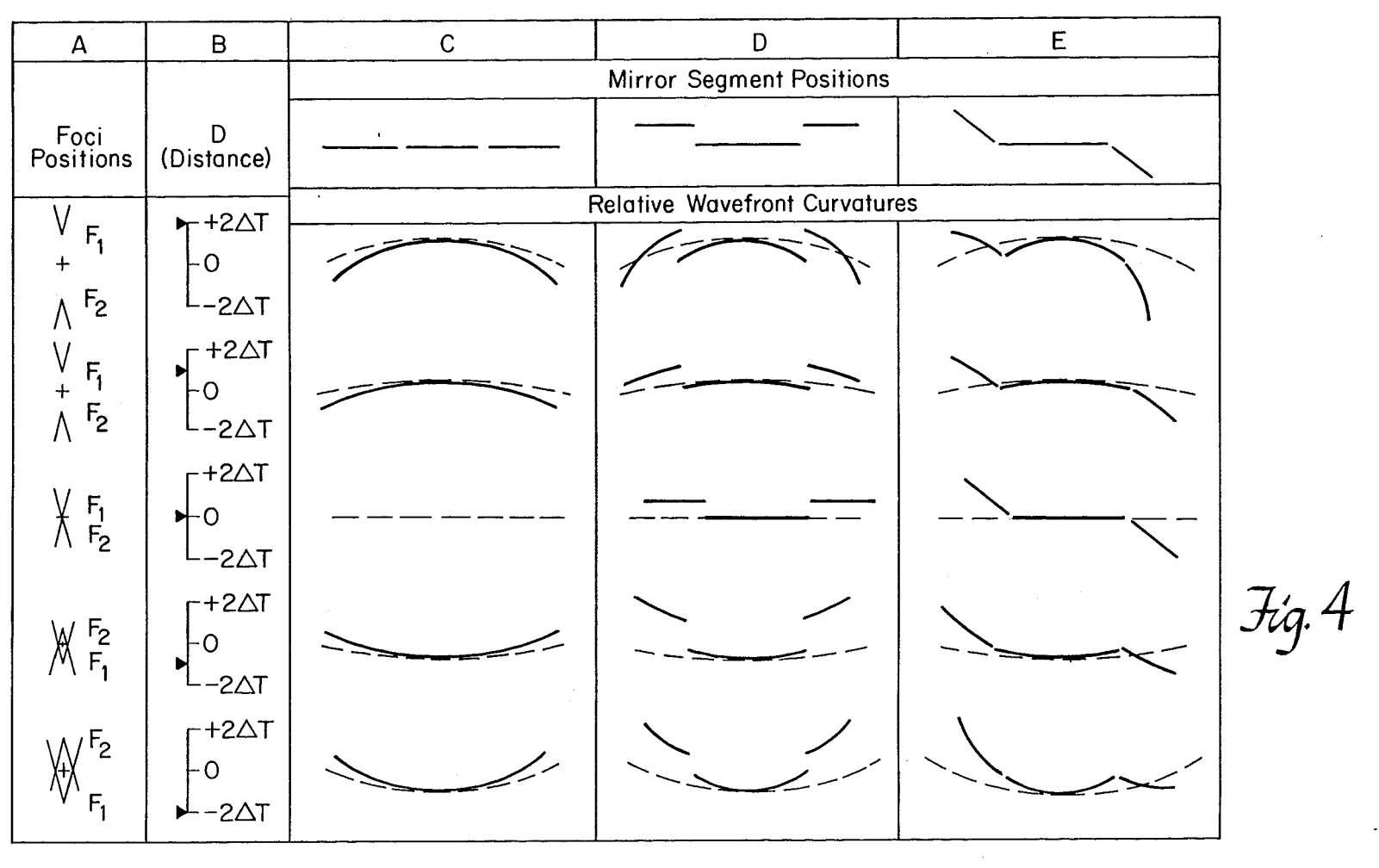

FIG. 4 gives a two-dimensional representation of the curvatures of overlapping wavefront portions for different relative positions of mirror segments. The image of all three segments is carried by the minified beam, while the image of the reference surface, not shown, is carried by the magnified beam. The wavefront carrying the images of the three segments, to be known as the "controlled" wavefront, is combined with the reference wavefront as a whole. A number of detectors are positioned in each region corresponding to the location of a different mirror image within the controlled wavefront. These detectors provide the necessary relative interference detection to control the individual mirror segments. Thus any number of mirror segment images may be part of the controlled wavefront, providing there are corresponding detectors for each portion in the detection region.

For each case in FIG. 4, the center segment is always aligned with the reference surface. In column C, all the mirror segments are aligned with the reference surface.

In column D, the two outside segments are displaced along the axis of incident light. In column E, the two surfaces are misaligned in tilt. In the figure, the reference wavefront curvature is shown by the dashed lines and the curvature of the controlled wavefront is shown by the solid lines. Colume A shows the relative positions of the foci in the trombone, And column B shows the foci offset D due to modulation. D is shown as a function of the trombone movement T from FIG. 3.

In column C, all three mirrors are aligned with the reference, so the wavefront curvatures change in a similar fashion. The reference wavefront is carried by the magnified beam, so the figure shows that its change in curvature, for the overlapping region, is not as great as that for minified beam. The wavefronts are coincident when the foci intersect, so detectors in all three regions would detect an interference fringe when D=0.

Column D shows the outside mirrors displaced from the position of the center mirror. Since the center mirror is aligned with the reference mirror, its corresponding portion of the controlled wavefront varies the same as it did in column C. The other segments, being set back in distance along the direction of incident light, cause their corresponding portions of the controlled wavefront to be lagging in time. Near D=2dT, the increased curvature of the controlled wavefront causes the lagging portions to curve severly enough to interfere with the reference wavefront, and a fringe is detected at corresponding points in the detection region. As D decreases, the wavefronts curve back the other way and there is no interference detected for the outside wavefront portions until D once again approaches the maximum value. The center portion, of course, is at full coincidence with the reference at D=0, since its corresponding mirror segment is in correct alignment.

In column E, a misalignment in tilt is shown for the outside mirror segments. The center segment is once again correctly aligned with the reference segment. The left edge of the left segment is tilted away from the incident light, so its corresponding wavefront portion has a lag in time which is zero adjacent to the center portion and increasing toward its outside edge. The right edge of the right segment is tilted toward the incident light, so its corresponding wavefront has a lead in time which is zero adjacent to the center portion and increasing toward its outside edge.

At D=2dT, the severity of curvature of the controlled wavefront keeps it ahead of the reference wavefront in the center section, but in the left region the time lag due to segment tilt compensates the curvature enough to create a point of interference. In the right region, the effects of the tilt and the wavefront curvature add, causing the controlled wavefront to be far ahead of the reference wavefront. As D decreases, the interference in the left region moves toward the center as the lag due to segment tilt begins to dominate the decreasing curvature of the controlled wavefront. The controlled wavefront is still far ahead of the reference wavefront in the right region, but is gradually moving closer. At D=0, the only interference is in the center region. The interference created when wavefronts curve in the other direction appears the same, but reversed. The right region gets the interference and the left region moves far ahead of the reference wavefront.

Since there are several detectors for each region, the position change of the interference with time is detected within each region and used to determine the necessary compensation for each corresponding segment. In this fashion, a number of segments can be controlled at once relative to the same reference surface.

Figure 5:
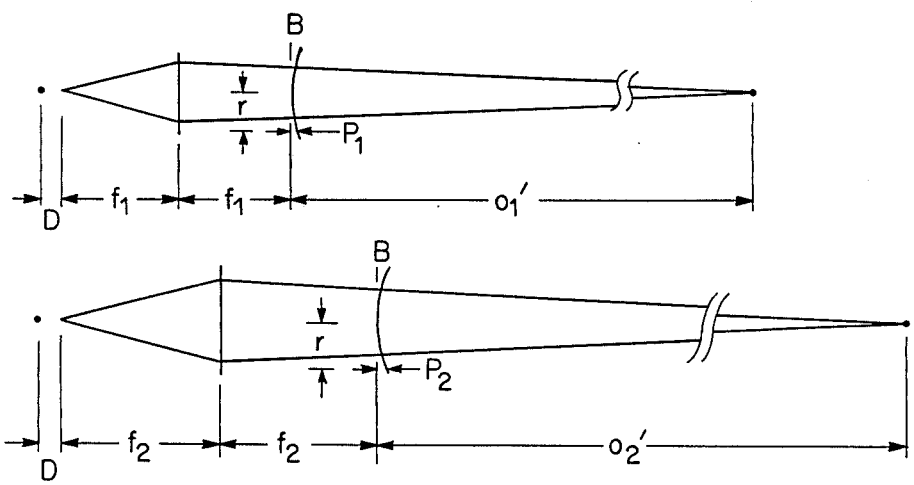
FIG. 5 shows geometry for calculating the "object distances" for the interfering beams.

The relationship between the focus offset D and the difference in phase P, between the two interfering beams in the detection region, is found as a function of the radial distance from the center of the beam r. As shown in FIG. 5, the "object distances" are calculated as a function of D from the thin lens formula. With correction for object shift, these are:

$$o_1' = f_1^2/D \quad o_2' = f_2^2/D \tag{1}$$

Figure 6:
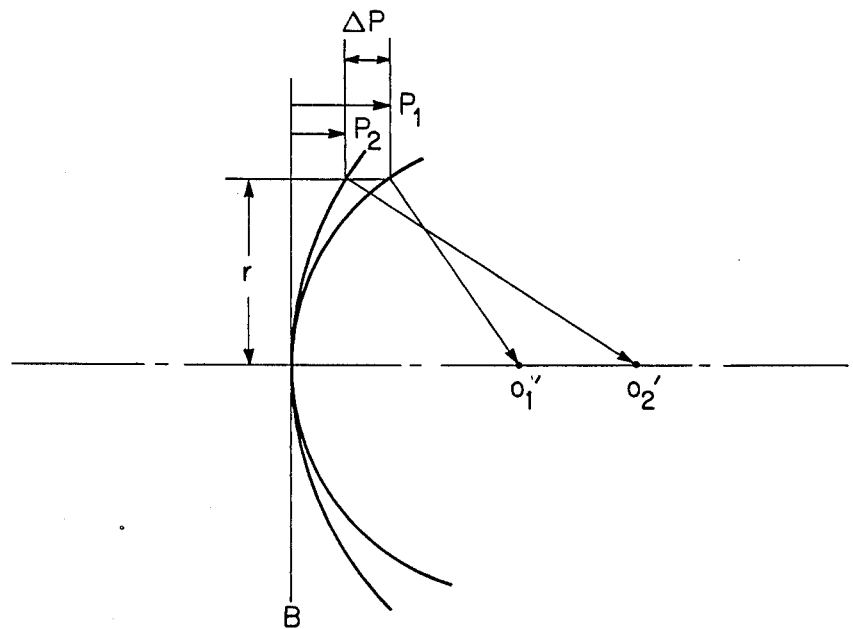
FIG. 6 gives the geometry for finding the Saggital Approximation for $\Delta P(r)$.

The light through either path is equiphase for the central ray and has a phase offset as shown in FIG. 6. Using the saggital approximation for a wave, converging to point o, the phase difference becomes:

$$\Delta P = P_2 - P_1 = \frac{r^2}{2o_2'} - \frac{r^2}{2o_1'} = \frac{r^2}{2}\left(\frac{f_2^2}{D}\right)^{-1} - \frac{r^2}{2}\left(\frac{f_1^2}{D}\right)^{-1} \tag{2}$$

rearranging terms:

$$\Delta P = \frac{D}{2} \frac{r^2}{f_1^2}\left(\frac{1}{m^2} - 1\right) \tag{3}$$

Knowing that the white light fringe is most readily observed when both interfering beams are of equal intensity, the optimal beamsplitter ratio between the intensity of beams R and T is found. The intensity R of the twice reflected and magnified reference beam should equal the intensity T of the twice transmitted and minified beam. The ratio between R and T can be found as follows:

$$(I_o/m^2)R^2 = I_o m^2 T^2$$

so, $$R = m^2 T$$

and therefore, $$R/T = m^2 \tag{4}$$

Figure 7:
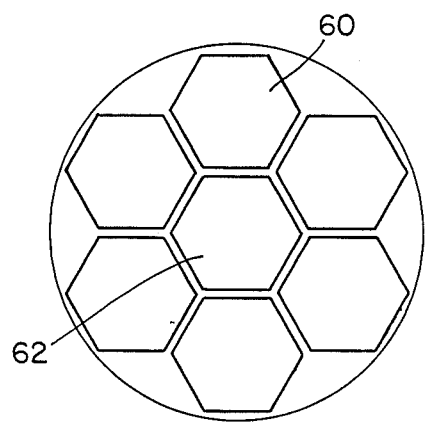
FIG. 7 shows a portion of a typical mirror array of hexagonal segments.

The concept outlined in this embodiment of the present invention is expanded to cover the control of a large array of reflective surfaces. If a central reference mirror is completely surrounded by a number of segments which are individually controlled, a shearing method as used in the example of FIG. 2 is applied. The surrounding mirrors replace the one controllable annular mirror, and each contributes to the controllable wavefront. The input beam is split and the divided beams are magnified and minified by the interferometer optics. With this type of radial shearing, each segment is combined with the reference segment to produce an interference fringe in its own section of the detection region FIG. 7 shows an array of hexagonal mirror segments 60 surrounding a reference segment 62. Each of these mirrors has three actuators to control it and three corresponding detectors in the image plane. The portion of the minified wavefront corresponding to the image of a certain segment 60 interferes with the portion of the magnified wavefront of the reference segment 62 which overlaps that region. If another array of mirrors surrounded the existing array 60, they could be referenced to the inner mirrors 60, 62 as a whole, once the mirrors were aligned correctly. In this manner, the size of the mirror array is expanded to fit the needs of the application.

I claim:

1. A method of analyzing a wavefront of light comprising:
    splitting the wavefront of light into wavefronts in plural paths of a shearing interferometer;
    modulating, relative to time, the curvatures of the wavefronts of light through the plural paths;
    recombining the wavefronts from the plural paths; and
    detecting the interference of the recombined wavefronts as a function of time.

2. The method of claim 1 wherein said light is white light.

3. The method of claim 1 wherein the light has a half-power bandwidth which is greater than one tenth of the center wavelength of the light.

4. The method of claim 3 wherein optical elements are contained in said plural paths which magnify and minify said wavefronts relative to one another.

5. The method of claim 4 wherein said modulation is accomplished by varying the length of said plural paths with time.

6. The method of claim 5 wherein said wavefront light is collimated before being split.

7. The method of claim 6 wherein said shearing interferometer is a radially shearing interferometer.

8. A method of orienting surfaces relative to each other comprising:
    reflecting light from the surfaces;
    splitting the wavefront of light from the surfaces into wavefronts in plural paths;
    modulating, relative to time, the curvatures of the wavefronts on light through the plural paths of a shearing interferometer;
    recombining the wavefronts from the plural paths;
    detecting the interference of the recombined wavefronts as a function of time; and
    orienting the surfaces to detect a predetermined interference relative to time.

9. A method of detecting the relative orientation of surfaces comprising:
    reflecting light from the surfaces;
    splitting the light from the surfaces into plural paths;
    providing magnification of the light along one path relative to that along the other path to overlap images of the two surfaces; modulating, relative to time, the curvatures of wavefronts of light through the plural paths;
    recombining the wavefronts from the plural paths;
    detecting the interference of the recombined wavefronts as a function of time.

10. The method of claim 9 wherein said light reflected from the surfaces is white light.

11. The method of claim 9 wherein the light reflected from the surfaces has a half-power bandwidth which is greater than one tenth of the center wavelength of said band.

12. The method of claim 11 wherein said modulation of the wavefront curvatures is accomplished by varying the lengths of said plural paths with time.

13. The method of claim 12 wherein said light reflected from the surfaces is collimated before being split.

14. A method of orienting reflective surfaces relative to each other comprising:
    reflecting light from the surfaces;
    splitting the light from the surfaces into plural paths;
    providing magnification of the light along one path relative to that along the other path to overlap images of the two surfaces;
    modulating, relative to time, the curvatures of wavefronts of light through the plural paths;
    recombining the wavefronts from the plural paths;
    detecting the interference of the recombined wavefronts as a function of time; and
    orienting the mirror segments to detect a predetermined interference relative to time.

15. In a segmented mirror system, a method of detecting the relative orientation of mirror segments comprising:
    directing light reflected from the mirror segments into an interferometer which divides the entering light into a first beam and a second beam which counterpropagate through a common beam path, wherein the common beam path contains optical elements which magnify the first beam while minifying the second beam;
    modulating the length of the common beam path with time;
    recombining said first beam and said second beam;
    detecting with photosensitive detectors constructive interference of light reflected from one mirror segment, as projected by said first beam, with the light reflected from another mirror segment, as projected by said second beam, as the length of the common beam path is modulated.

16. The method of claim 15 wherein the light redirected by the segmented mirror system is white light.

17. The method of claim 15 wherein the light reflected from the mirror segments has a half-power bandwidth which is greater than one tenth of the center wavelength of the light.

18. The method of claim 17 wherein the light reflected by the segmented mirror is collimated before entering the interferometer.

19. The method of claim 18 wherein said first beam and said second beam are focused along the common beam path, the two focal points moving with reciprocating motion along a common axis as the path length is modulated.

20. The method of claim 19 wherein one of said mirror segments is shaped annularly, while another segment is shaped circularly fitting within the inner radius of the annular mirror segment.

21. In a segmented mirror system, a method of orienting mirror segments relative to each other, the method comprising:
    directing light reflected from the mirror segments into an interferometer which divides the entering light into a first beam and a second beam which counterpropagate through a common beam path, wherein the common beam path contains optical elements which magnify the first beam while minifying the second beam;
    modulating the length of the common beam path with time;
    recombining said first beam and said second beam;

detecting, with photosensitive detectors, constructive interference of light reflected from one mirror segment, as projected by said first beam, with light reflected from another mirror segment, as projected by said second beam, as the length of the common beam path is modulated;

reorienting the mirror segments relative to each other to detect a predetermined interference relative to time.

22. The method of claim 21 wherein said light reflected from the mirror segments is white light.

23. The method of claim 21 wherein the light has a half-power bandwidth which is greater than one tenth of the center wavelength of the light.

24. The method of claim 23 wherein said method includes collimating said light reflected from the mirror segments before directing it into the interferometer.

25. The method of claim 24 wherein said method includes focusing said first beam and said second beam along the common beam path, the two focal points falling on a common axis and moving with a reciprocating motion, due to said path length modulation, along said common axis periodically passing through a confocal point.

26. In a segmented mirror system, a method of orienting mirror segments relative to each other, the method comprising:

collimating wide bandwidth light reflected from the mirror segments, and directing it into an interferometer;

dividing the collimated light into a first beam and a second beam which counterpropagate through a common beam path, wherein the beam path contains optical elements magnifying said first beam by a chosen factor while minifying said second beam;

focusing said first beam and said second beam along the common beam path, the two focal points falling on a common axis;

modulating the common beam path in time, causing the focal points of said first beam and said second beam to move with reciprocating motion along said common axis to periodically pass through a confocal point;

recombining said first beam and said second beam;

detecting, with photosensitive detectors, constructive interference of light reflected from one mirror segment as projected by said first beam, with light reflected by another mirror segment as projected by said second beam; and orienting the mirror segments to detect a predetermined interference relatime to time.

27. An interferometer comprising:

a beam splitter which divides the entering light into a first beam and a second beam which counterpropagate through a common beam path;

optical elements in the common beam path which focus the counterpropagating beams, said elements magnifying the first beam while minifying the second beam;

a path length modulator which varies the length of the common beam path with time; and a recombination means which recombines said first beam and said second beam creating interference between the two beams.

28. The interferometer of claim 27 wherein said interferometer includes a collimator which collimates the entering light before it reaches the beam splitter.

29. The interferometer of claim 28 wherein said path length modulator comprises a first mirror and a second mirror within the common beam path, such that said first counterpropagating beam is redirected by said first mirror to said second mirror, and said second counterpropagating beam is redirected by said second mirror to said first mirror, and wherein the positions of said first mirror and said second mirror are varied with time to cause the distance of the common beam path along the common beam axis to change periodically.

30. The interferometer of claim 29 wherein said pair of mirrors is located within the common beam path such that the focal point of each of said counterpropagating beams lies between said mirror pair.

* * * * *